C. F. JENKINS.
VALVE.
APPLICATION FILED DEC. 2, 1911.
1,047,529.
Patented Dec. 17, 1912.
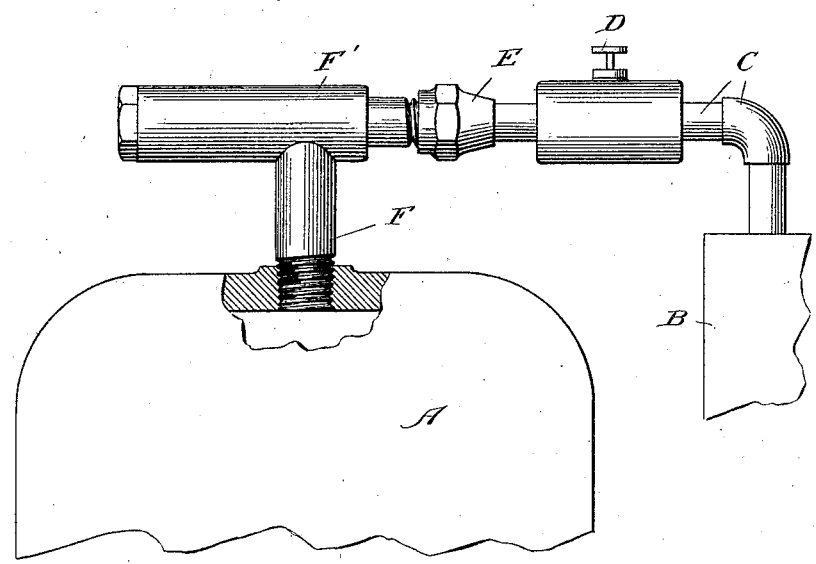
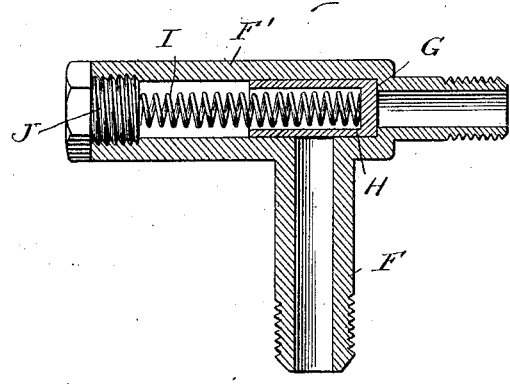

UNITED STATES PATENT OFFICE.

CHARLES FRANCIS JENKINS, OF WASHINGTON, DISTRICT OF COLUMBIA.

VALVE.

1,047,529.  Specification of Letters Patent.  Patented Dec. 17, 1912.

Application filed December 2, 1911. Serial No. 663,632.

*To all whom it may concern:*

Be it known that I, CHARLES FRANCIS JENKINS, citizen of the United States, residing at Washington, in the District of Columbia, have invented certain new and useful Improvements in Valves, of which the following is a specification, reference being had therein to the accompanying drawing.

My invention relates to valves adapted to open automatically under pressure of fluid in one direction and to be unaffected by suction upon the opposite side of the valve. Such a valve arrangement is highly desirable in many situations, and for illustration the novel valve is shown in connection with the cylinder of an internal combustion engine and with apparatus for starting the engine by compressed fluid, whether atmospheric air or otherwise.

In the accompanying drawings, Figure 1 shows the apparatus in side elevation. Fig. 2 is an axial section of the valve and its casing.

In these figures, A represents the cylinder of an internal combustion engine, B a reservoir or source of supply for gas under pressure, C a pipe through which the compressed fluid passes from the source of supply to the cylinder, D a spring-closed, manually-opened valve, without novelty, governing the passing of fluid through the pipe C, and E a coupling connecting the pipe to the valve casing. The casing is T-shaped, the hollow stem member F being screwed into the cylinder A and one end of hollow cross bar F' being connected to the pipe C by the coupling E. The passage in the stem F intersects the passage in the cross bar, and the latter passage is provided with an annular offset or shoulder G, likewise the stem F and the coupling E, forming a valve seat. Within the cross bar is a cylindrical sliding valve H, which is normally pressed against the valve seat by an axial spring I reacting against a plug J screwed into the opposite end of the cross bar. The valve when closed covers the passage in the stem F and extends for some distance on either side of the same, and the parts are so proportioned that the valve may be pushed back from its end-seat so far as to fully uncover the stem passage.

It is obvious that when the valve is closed only a part of its end face is exposed to the pressure of fluid in the pipe C, and that as soon as it begins to open the whole end surface is exposed. It follows that the valve will not open until the pressure upon the smaller area is sufficient to overcome the resistance of the spring, and that as soon as this movement begins there is an increase of opening force, with the result of quick opening regardless of slight increase of resistance as the spring's compression increases.

For starting the engine, the spring valve is opened and held open as long as may be desired. Compressed fluid at once opens the valve H and flows into the cylinder so long as the pressure therein is lower than that in the pipe C. The instant the pressure in the pipe falls below the force of the spring, the valve is closed by the latter, and no suction on the cylinder side of the valve has any tendency to open it, but tends rather to more forcibly press the valve toward the stem F. We have then a valve automatically opening to allow fluid to pass into the stem passage and to the cylinder, but unopenable by any suction created in the same passage. The construction is such that only a small fraction of the valve's surface is exposed to the action of gases in the cylinder, and this fraction is scraped with a shearing cut, by the sharp edge around the mouth of the stem passage, each time that the valve opens. The valve is thus remarkably certain in operation, and in long use practically, sticking has never occurred.

It is evident that the exact forms shown are not essential.

What I claim is:

1. The combination with an engine cylinder, of a casing provided with a cylindrical valve passage, a conduit leading from said cylinder into the side of said passage, a cylindrical valve sliding in said passage and normally excluding therefrom fluid from said cylinder, a spring yieldingly resisting the sliding of said valve from normal position, and a conduit leading to that end of the valve opposite to said spring.

2. The combination with an engine cylinder and an adjacent reservoir for fluid under high pressure, of a casing having a cylindrical valve passage, a valve fitting and sliding in said passage and normally excluding therefrom fluid from said cylinder, a spring offering yielding resistance to the sliding of the valve from normal position, a conduit leading from said cylinder to the side of the valve when the latter is in normal position, and a conduit leading from the said reservoir to that end of the valve opposite said spring.

3. In apparatus of the class described, the combination with a closed receptacle of a valve casing provided with a valve passage, a closely fitting valve sliding in said passage and normally excluding therefrom fluid from said receptacle, a stop for the valve, a spring resisting the movement of the valve from the stop, a conduit leading from the receptacle into said passage at a point in that portion normally occupied by the valve, a source of fluid under pressure, and a conduit leading from said source to that side of the valve where the application of pressure tends to overcome the resistance of the spring.

In testimony whereof I affix my signature in presence of two witnesses.

CHARLES FRANCIS JENKINS.

Witnesses:
ROBERT CRAIG GREENE,
JAMES L. CRAWFORD.

Copies of this patent may be obtained for five cents each, by addressing the "Commissioner of Patents, Washington, D. C."